(12) United States Patent  
Do et al.

(10) Patent No.: US 9,355,304 B2  
(45) Date of Patent: May 31, 2016

(54) APPARATUS AND METHOD OF DETERMINING FACIAL EXPRESSION TYPE

(71) Applicant: KOREA INSTITUTE OF ORIENTAL MEDICINE, Daejeon (KR)

(72) Inventors: Jun Hyeong Do, Daejeon (KR); Ji Ho Nam, Daejeon (KR); Jun Su Jang, Daejeon (KR); Si Woo Lee, Daejeon (KR); Ji Ho So, Daejeon (KR); Na Hye Kim, Daejeon (KR); Jong Yeol Kim, Daejeon (KR)

(73) Assignee: KOREA INSTITUTE OF ORIENTAL MEDICINE, Daejeon (KR)

( * ) Notice: Subject to any disclaimer, the term of this patent is extended or adjusted under 35 U.S.C. 154(b) by 0 days.

(21) Appl. No.: 14/553,972

(22) Filed: Nov. 25, 2014

(65) Prior Publication Data

US 2015/0310262 A1 Oct. 29, 2015

(30) Foreign Application Priority Data

Apr. 23, 2014 (KR) ........................ 10-2014-0048689

(51) Int. Cl.  
*G06K 9/00* (2006.01)

(52) U.S. Cl.  
CPC .................................. *G06K 9/00308* (2013.01)

(58) Field of Classification Search  
USPC .......................................................... 382/118  
See application file for complete search history.

(56) References Cited

U.S. PATENT DOCUMENTS

| 2011/0007174 | A1* | 1/2011 | Bacivarov | G06K 9/00281 348/222.1 |
| 2012/0314957 | A1* | 12/2012 | Narikawa | G06K 9/00288 382/195 |
| 2015/0086121 | A1* | 3/2015 | Morishita | G06K 9/00248 382/201 |
| 2015/0269424 | A1* | 9/2015 | Bacivarov | G06K 9/00302 382/203 |

FOREIGN PATENT DOCUMENTS

| JP | 2010-250420 A | 11/2010 |
| JP | 2011-130996 A | 7/2011 |
| KR | 10-2013-0024065 A | 3/2013 |

* cited by examiner

*Primary Examiner* — Wesley Tucker  
(74) *Attorney, Agent, or Firm* — McDermott Will & Emery LLP

(57) ABSTRACT

A method of determining a facial expression type may include extracting feature points representing facial characteristics from a facial image of a user; grouping the extracted feature points into a plurality of regions; and determining a facial expression type for each of a plurality of groups using feature points and a facial expression type function corresponding to each of the groups.

15 Claims, 9 Drawing Sheets

FIG. 5
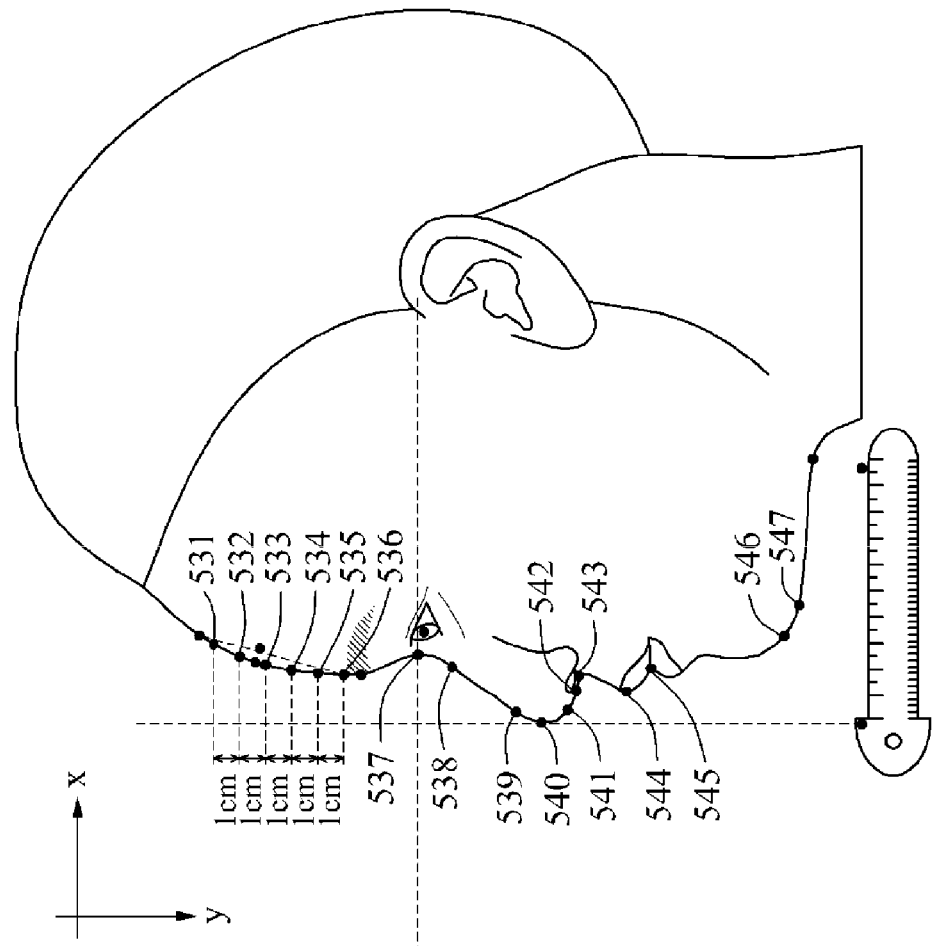
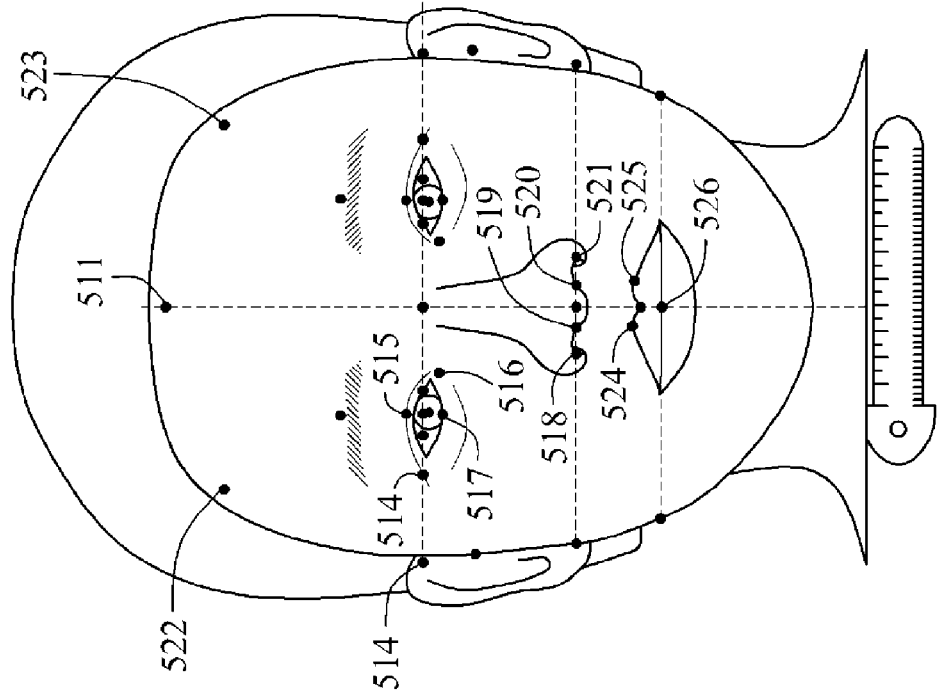

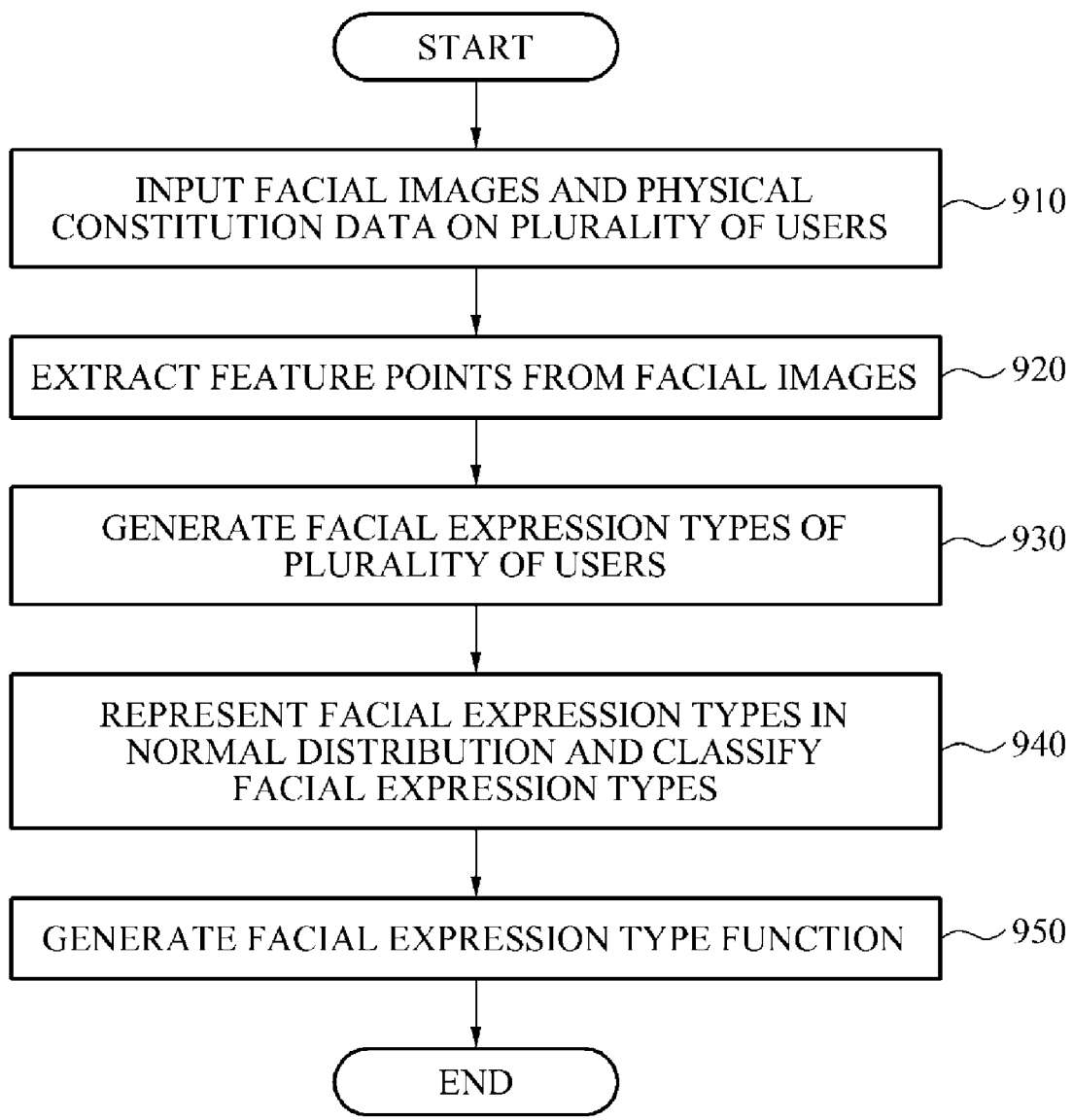

APPARATUS AND METHOD OF DETERMINING FACIAL EXPRESSION TYPE

CROSS-REFERENCE TO RELATED APPLICATION

This application claims the priority benefit of Korean Patent Application No. 10-2014-0048689, filed on Apr. 23, 2014, in the Korean Intellectual Property Office, the disclosure of which is incorporated herein by reference.

BACKGROUND

1. Field of the Invention

Embodiments of the present invention relate to an apparatus and method of determining a facial expression type, and more particularly, to an apparatus and method of determining a facial expression by analyzing a face of a user.

2. Description of the Related Art

In modern society, a focus on health consciousness has been increasing. In line with the increasing focus on health consciousness, related technologies, for example, a data analysis method and tool based on real-time collection of data, have been developed and advanced. Thus, monitoring a state of health and receiving a personalized healthcare service are enabled.

In addition, customer demands have diversified and a level of expectation has increased due to a change in overall consumer consciousness. Thus, added emphasis is being placed on convenience and customization in using health services and related systems. For example, personalized healthcare businesses are performed based on data associated with health of individuals, for example, prevention of lifestyle related diseases and weight control programs, are experiencing rapid growth.

In the past, healthcare services were limited to treatment of diseases provided mainly to patients by hospitals or medical centers. However, the healthcare services presently encompass, for example, preventing diseases in advance and maintaining health, and are provided to healthy people.

Recently, research is actively conducted to determine a constitution or a state of healthiness based on a facial condition.

Accordingly, there is desire for an apparatus for extracting a feature point using a facial image and determining a facial expression type.

SUMMARY

According to an aspect of the present invention, there is provided a method of determining a facial expression type, the method including extracting feature points representing facial characteristics from a facial image of a user; grouping the extracted feature points into a plurality of regions; and determining a facial expression type for each of a plurality of groups using feature points and a facial expression type function corresponding to each of the groups.

The method may further include displaying the determined facial expression type of the user.

The determining of the facial expression type for each of the groups may include receiving an input of age information on the user; calibrating the facial expression type function on the basis of the age information; and determining the facial expression type for each of the groups using the calibrated facial expression type function.

The calibrating of the facial expression type function may include dividing the age information into predetermined age groups; calculating widths and lengths of the respective regions using the feature points; calculating averages and standard deviations of the widths and lengths of the respective regions in the divided age groups; and calibrating the facial expression type function using the averages and standard deviations.

The method may further include generating the facial expression type function, wherein the generating of the facial expression type function includes receiving facial images of a plurality of users; extracting feature points corresponding to regions of the users from the facial images of the users; generating facial expression types using the feature points corresponding to the regions of the users; representing the generated facial expression types in a normal distribution and classifying the facial expression types according to a preset criterion; and generating a facial expression type function using the classified facial expression types.

The plurality of regions may include at least one of a face, an eye, a forehead and a nose, and the facial expression type for each of the groups is represented using at least one of a face shape, an eye shape, a forehead shape and a nose shape.

The plurality of regions may include at least one of a face, an eye, a forehead and a nose, and the facial expression type is represented based on widths and lengths of regions of a face shape, an eye shape, a forehead shape and a nose shape.

The face shape may be divided according to a first predetermined criterion into round, oval, long, square, rectangular, trapezoid and inverted triangular shapes, the eye shape may be divided according to a second predetermined criterion into a cow eye, a tiger eye, a deer eye and a hawk eye, the forehead shape may be divided according to a third predetermined criterion into a sloping and projecting forehead, a straight and projecting forehead, a sloping and flat forehead and a straight and flat forehead, and the nose shape may be divided according to a fourth predetermined criterion into a downturned high nose, an upturned high nose, a downturned flat nose and an upturned flat nose.

The method may further include combining facial expression types of the respective groups.

According to another aspect of the present invention, there is provided a method of generating a facial expression type function which generates a facial expression type function, the method including: receiving facial images of a plurality of users; extracting feature points corresponding to regions of the users from the facial images of the users; generating facial expression types using the feature points corresponding to the regions of the users; representing the generated facial expression types in a normal distribution and classifying the facial expression types according to a preset criterion; and generating a facial expression type function using the classified facial expression types.

The regions may include at least one of a face, an eye, a forehead and a nose, and the facial expression types are represented using at least one of a face shape, an eye shape, a forehead shape and a nose shape.

The facial expression types may be determined using a distribution of the feature points for the respective regions.

The regions may include at least one of a face, an eye, a forehead and a nose, and the facial expression types are represented based on widths and lengths of the regions.

The representing of the generated facial expression types in a normal distribution and classifying of the facial expression types according to the preset criterion may include representing the widths and lengths of the regions of the users in a normal distribution; and classifying the normal distribution into predetermined sections.

The face shape may be divided according to a first predetermined criterion into round, oval, long, square, rectangular, trapezoid and inverted triangular shapes, the eye shape may be divided according to a second predetermined criterion into a cow eye, a tiger eye, a deer eye and a hawk eye, the forehead shape may be divided according to a third predetermined criterion into a sloping and projecting forehead, a straight and projecting forehead, a sloping and flat forehead and a straight and flat forehead, and the nose shape may be divided according to a fourth predetermined criterion into a downturned high nose, an upturned high nose, a downturned flat nose and an upturned flat nose.

According to still another aspect of the present invention, there is provided a non-transitory computer-readable recording medium recording a program to implement a method of generating a facial expression type function, the method of generating the facial expression type function including: receiving facial images of a plurality of users; extracting feature points corresponding to regions of the users from the facial images of the users; generating facial expression types using the feature points corresponding to the regions of the users; representing the generated facial expression types in a normal distribution and classifying the facial expression types according to a preset criterion; and generating a facial expression type function using the classified facial expression types.

According to yet another aspect of the present invention, there is provided an apparatus for determining a facial expression type, the apparatus including: an extraction unit to extract feature points representing facial characteristics from a facial image of a user; a grouping unit to group the extracted feature points into a plurality of regions; and a facial expression type determination unit to determine a facial expression type for each of a plurality of groups using feature points and a facial expression type function corresponding to each of the groups.

The apparatus may further include an input unit to receive an input of age information on the user, wherein the facial expression type determination unit may calibrate the facial expression type function on the basis of the age information and determine the facial expression type for each of the groups using the calibrated facial expression type function.

According to still another aspect of the present invention, there is provided an apparatus for generating a facial expression type function which generates a facial expression type function, the apparatus including: an input unit to receive facial images of a plurality of users; an extraction unit to extract feature points corresponding to regions of the users from the facial images of the users; a facial expression type generation unit to generate facial expression types using the feature points corresponding to the regions of the users; a classification unit to represent the generated facial expression types in a normal distribution and to classify the facial expression types according to a preset criterion; and a function generation unit to generate a facial expression type function using the classified facial expression types.

The regions may include at least one of a face, an eye, a forehead and a nose, and the facial expression types are represented using at least one of a face shape, an eye shape, a forehead shape and a nose shape.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 illustrates examples of feature points in a facial image according to an embodiment;

FIG. 9 is a flowchart illustrating a method of generating a facial expression type function according to an embodiment.

DETAILED DESCRIPTION

Figure 1:
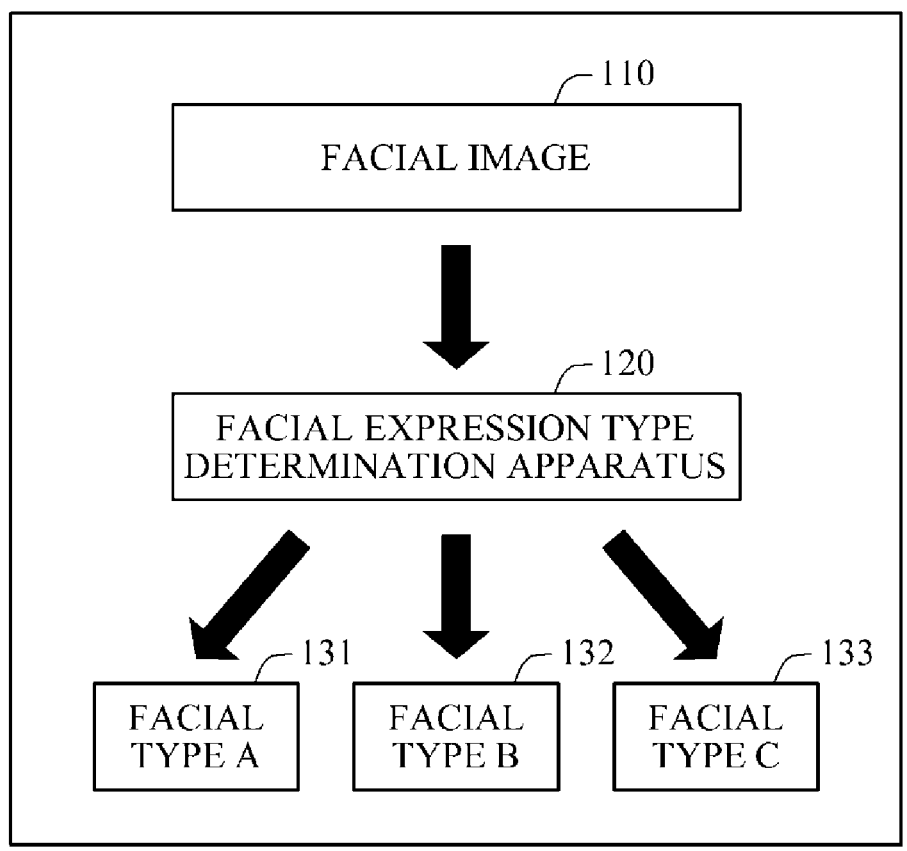
FIG. 1 illustrates a concept view of an apparatus for determining a facial expression type according to an embodiment.

Hereinafter, a few embodiments will be described in detail with reference to the accompanying drawings. However, these embodiments are provided not for restrictive or limiting purposes. Like reference numerals refer to the like elements throughout. Exemplary embodiments are described below to explain the present invention by referring to the figures.

General terms commonly used are adopted for the following description in view of functions in the present invention but may be changed depending on the intent of an operator, customs or appearance of novel technology.

In specific cases, terms randomly selected by the applicant may be used for easier understanding and/or convenience of description, in which case their meanings will be defined in relevant description. Therefore, the terms used herein should be understood not by their mere names but based on their meanings and the following overall description of this specification.

FIG. 1 illustrates a concept view of an apparatus for determining a facial expression type according to an embodiment.

According to the embodiment, the apparatus for determining the facial expression type (also referred to as "facial expression type determination apparatus") 120 may determine a facial expression type of a user through facial image analysis. In the embodiment, the facial expression type determination apparatus 120 may extract feature points from a facial image 110 and determine a facial type 131, 132 or 133 of the user using the feature points and a facial expression type function.

The facial expression type determination apparatus 120 may extract feature points representing facial characteristics from the facial image. The extracted feature points may be points for reproducing a face of the user from the facial image. The feature points may be extracted from a plurality of regions of the facial image of the user. The feature points extracted from the plurality of regions may be grouped by region.

According to the embodiment, the facial expression type determination apparatus 120 may determine a facial expression type for each of a plurality of groups using feature points and a facial expression type function corresponding to each group.

Hereinafter, an apparatus and method of determining a facial expression type will be described with reference to FIGS. 2 to 4.

Figure 2:
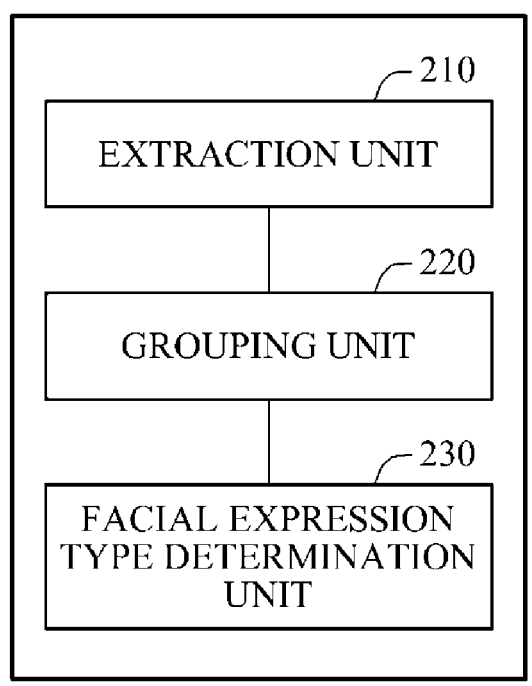
FIG. 2 is a block diagram illustrating a configuration of an apparatus for determining a facial expression type according to an embodiment.

FIG. 2 is a block diagram illustrating a configuration of an apparatus for determining a facial expression type according to an embodiment.

According to the embodiment, the facial expression type determination apparatus 120 may include an extraction unit 210, a grouping unit 220 and a facial expression type determination unit 230. The extraction unit 210 may extract a feature point representing a facial characteristic from a facial image of a user. The feature point representing the facial characteristic may be extracted from at least one part of a face, an eye, a forehead and a nose.

The facial expression type determination apparatus 120 may determine a facial expression type of the user from the facial image. Here, the facial expression type may be represented using at least one of a face shape, eye shape, forehead shape and nose shape.

According to one embodiment, the face shape may be divided according to a first predetermined criterion into round, oval, long, square, rectangular, trapezoid and inverted triangular shapes. Here, the first criterion may be based on a degree of longness or roundness of a face shape.

According to another embodiment, the eye shape may be divided according to a second predetermined criterion into a cow eye, a tiger eye, a deer eye and a hawk eye. Here, the second criterion may be based on a degree of longness of tips of a user's eyes and roundness of an overall eye shape.

According to still another embodiment, the forehead shape may be divided according to a third predetermined criterion into a sloping and projecting forehead, a straight and projecting forehead, a sloping and flat forehead, and a straight and flat forehead. Here, the third criterion may be based on a slope of a user's forehead and a degree of a projecting forehead.

According to yet another embodiment, the nose shape may be divided according to a fourth predetermined criterion into a downturned high nose, an upturned high nose, a downturned flat nose, and an upturned flat nose. The fourth criterion may be based on a shape of a nasal tip and nose height.

Meanwhile, the grouping unit 220 may group extracted feature points into a plurality of regions. The plurality of regions may include a face region for determining a face shape, an eye region for determining an eye shape, a forehead region for determining a forehead shape, and a nose region for determining a nose shape. For example, the grouping unit 220 may group the extracted feature points into the face region, the eye region, the forehead region and the nose region, which will be described in detail with reference to FIG. 5.

The facial expression type determination unit 230 may determine a facial expression type for each of a plurality of groups using feature points and a facial expression type function corresponding to each group. A facial expression type function is a function which receives facial images from a plurality of users and determines face types of the users.

The facial expression type function may be generated from an apparatus for generating a facial expression type function (also referred to as "facial expression type function generation apparatus"). The facial expression type function generation apparatus may extract a feature point from a first region of the facial images of the users to determine a facial expression type.

According to the embodiment, the facial expression type determination apparatus 120 may receive facial images of a plurality of users and extract feature points from the facial images of the users. The facial expression type determination apparatus 120 may generate facial expression types of the respective users using the extracted feature points and represent the facial expression types in a normal distribution. The facial expression type determination apparatus 120 may classify the facial expression types in the normal distribution according to a preset criterion and generate a facial expression type function using the classified facial expression types. An apparatus and a method of generating a facial expression type function will be described in detail with reference to FIGS. 8 and 9.

Here, the facial expression type function may be generated by an external device separate from the facial expression type determination apparatus 120 or alternatively by a device embedded in the facial expression type determination apparatus 120. That is, the facial expression type function may be generated not only by the facial expression type determination apparatus 120 but also physically outside the facial expression type determination apparatus 120 without departing from the spirit and scope of the present invention.

According to one embodiment, the facial expression type determination apparatus 120 may display a determined facial expression type of a user on a display unit.

According to one embodiment, the facial expression type determination apparatus 120 may further include an input unit. The input unit may receive an input of user age information.

Meanwhile, the facial expression type determination unit 230 may calibrate the facial expression type function based on the input age information. The facial expression type determination unit 230 may calibrate the facial expression type for each of the groups using the calibrated facial expression type function.

In detail, the input unit may divide the input user age information into predetermined age groups. Here, the predetermined age groups may be regular ranges. The extraction unit may extract feature points representing facial characteristics from a facial image of a user. The facial expression type determination unit 230 may calculate widths and lengths of a plurality of regions using the extracted feature points. For example, the facial expression type determination unit 230 may calculate a width and a length of an eye region, using the feature points.

Also, the facial expression type determination unit 230 may calculate averages and standard deviations of the widths and lengths of the respective regions in the divided age groups. The facial expression type determination unit 230 may calibrate the facial expression type function using the calculated averages and standard deviations.

Hereinafter, various operations and applications implemented by the facial expression type determination apparatus will be illustrated, in which matters to be clearly understood and conceived by a person having ordinary skill in the art may be realized by general implementation without specifying any of the extraction unit, the grouping unit and the facial expression type determination unit and the scope of claims of the present invention is not limited by titles or physical/logical structures of particular components.

Figure 3:
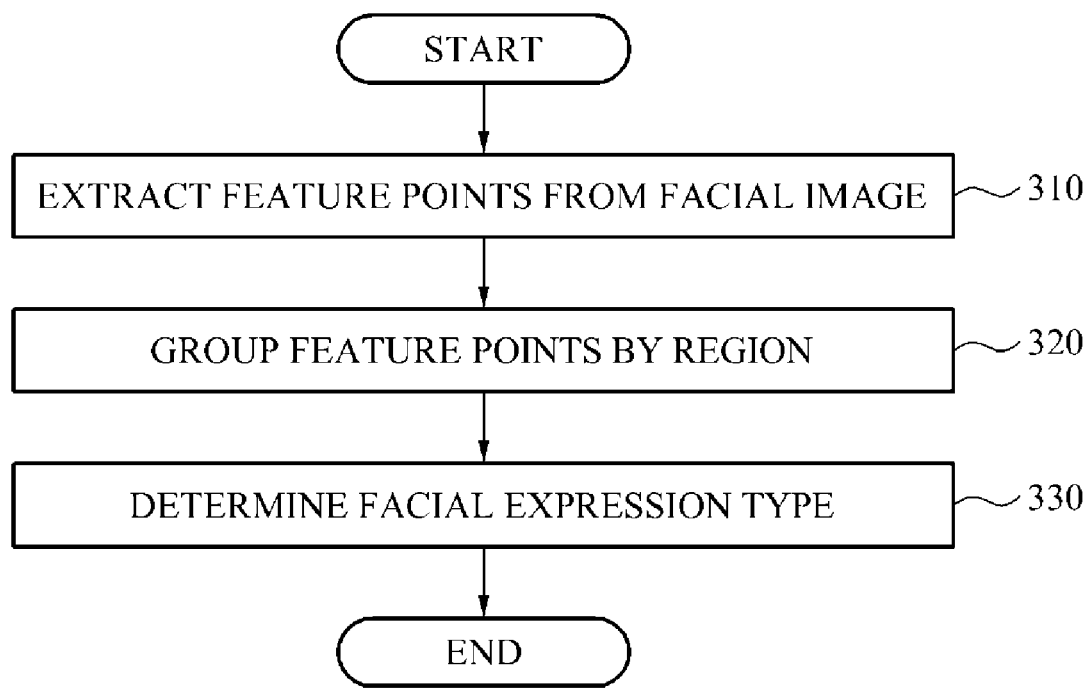
FIG. 3 is a flowchart illustrating a method of determining a facial expression type according to an embodiment.

FIG. 3 is a flowchart illustrating a method of determining a facial expression type according to an embodiment.

According to the embodiment, the facial expression type determination apparatus may extract feature points representing facial characteristics from a facial image of a user in operation 310. The facial image may be obtained by the facial expression type determination apparatus taking a picture of the user or by an external device taking a picture of the user. The feature points representing the facial characteristics may be used to reproduce a face of the user. The feature points may be extracted from the facial image of the user. The feature points may be extracted from a face region, an eye region, a forehead region and a nose region of the user in the facial image.

According to the embodiment, the facial expression type determination apparatus may group the extracted feature points into a plurality of regions in operation 320. The grouping unit may group the feature points extracted from the face region, the eye region, the forehead region and the nose region. For example, the grouping unit may group feature points from the face region in a first group, feature points from the eye region in a second group, feature points from the forehead region in a third group, and feature points from the nose region in a fourth group.

The facial expression type determination apparatus may determine a facial expression type for each of a plurality of groups using feature points and a facial expression type function corresponding to each group in operation 330. For instance, as described above, the first group, which is a group of the feature points extracted from the face region, may be used to determine a face shape. A face shape of the user may be determined on the basis of the extracted feature points. The facial expression type may be determined as round, oval, long, square, rectangular, trapezoid and inverted triangular shapes based on a degree of longness or roundness of a face shape.

The facial expression type determination apparatus may generate a facial expression type function. A facial expression type function is a function which receives facial images from a plurality of users and determines face expression types of the users. The facial expression type determination apparatus may analyze the facial images of the users and determine a facial expression type for each user. Facial expression types based on the facial images of the users may form a database. An apparatus and a method of generating a facial expression type function will be described with reference to FIGS. 8 and 9.

According to another embodiment, the facial expression type determination apparatus may invoke a facial expression type function for the feature points corresponding to each of the groups.

According to still another embodiment, the facial expression type determination apparatus may display a determined facial expression type of a user. The facial expression type may be displayed on an electronic device, such as a monitor, or the facial expression type may be transmitted to a smart phone of the user for display.

Figure 4:
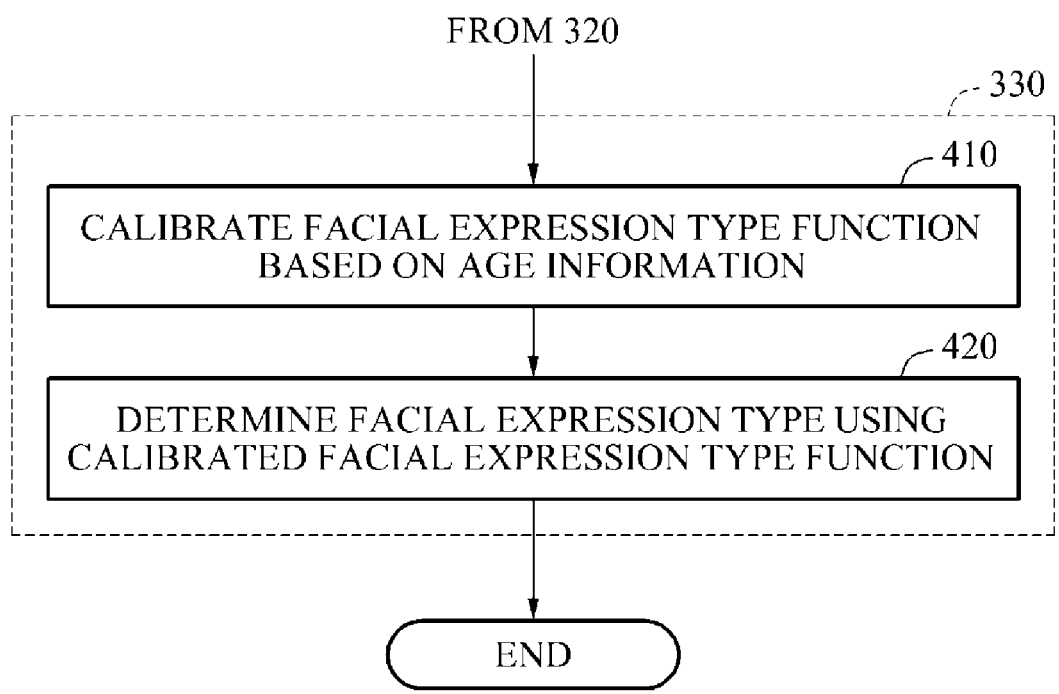
FIG. 4 is a flowchart illustrating an operation of determining a facial expression type of FIG. 3 in detail according to an embodiment.

FIG. 4 is a flowchart illustrating an operation of determining a facial expression type of FIG. 3 in detail according to an embodiment.

According to the embodiment, the facial expression type determination apparatus may receive an input of age information on a user. Here, the age information may include an age of the user.

For example, a 1-10 age group, 11-20 age group, 21-30 age group, 31-40 age group, 41-50 age group, 51-60 age group, and over 60 age group may be set. When the user is 35 years old, the facial expression type determination apparatus may calibrate the facial expression type function on the basis of facial expression type data on the 31-40 age group.

According to another embodiment, the facial expression type determination apparatus may calibrate the facial expression type function on the basis of the age information on the user in operation 410. For instance, a criterion for determining an eye shape of a 40-45 age group may be different from a criterion for determining an eye shape of a 20-25 age group. A method of setting these criteria may be determined using a normal distribution of eye shapes of users in each age group. Setting a criterion for determining a facial expression type by age may be conducted in the facial expression type determination apparatus or outside the facial expression type determination apparatus, and the criterion may be received and used for calibrating the facial expression type function.

According to the embodiment, the facial expression type determination apparatus may determine a facial expression type for each of the groups using the calibrated facial expression type function in operation 420. That is, facial expression types may be determined with respect to the face region, eye region, forehead region and nose region, respectively.

FIG. 5 illustrates examples of feature points in a facial image according to an embodiment.

According to the embodiment, the facial expression type determination apparatus may extract feature points representing facial characteristics from the facial image. The facial expression type determination apparatus may group the extracted feature points into a plurality of regions. The plurality of regions may include a face region, an eye region, a forehead region and a nose region. The regions may also include a region representing a facial characteristic of a user in addition to the aforementioned regions.

According to one embodiment, diagram 510 illustrates an image including a front view of a user face. The extraction unit may extract feature points from at least one of the face region, the eye region, the forehead region and the nose region.

Feature points representing characteristics of the face region may be extracted from face boundaries 511, 512, 513, 522 and 523 of the user. Feature points representing characteristics of the eye region may be extracted from eye boundaries 514, 515, 516 and 517 of the user. Feature points representing characteristics of the forehead region may be extracted from forehead boundaries 511, 522 and 523 of the user. Feature points representing characteristics of the nose region may be extracted from nose boundaries 518, 519, 520 and 521 of the user. Further, feature points representing characteristics of a lip region may be extracted from lip boundaries 524, 525 and 526 of the user. The regions and positions of the feature points in the regions mentioned above are provided for illustrative purposes only, and feature points may be extracted from other regions and different points.

According to another embodiment, diagram 530 illustrates an image including a profile of a user face. The extraction unit may extract feature points from at least one of the face region, the eye region, the forehead region and the nose region.

Feature points representing characteristics of the face region may be extracted from face boundaries 531, 534, 536, 538, 540 and 544 of the user. Feature points representing characteristics of the eye region may be extracted from an eye boundary 537 in the profile. Feature points representing characteristics of the forehead region may be extracted from forehead boundaries 531, 532, 533, 534, 535 and 536 in the profile. In diagram 530, feature points are extracted at 1 cm intervals. Feature points representing characteristics of the nose region may be extracted from nose boundaries 538, 539, 540, 541, 542 and 543 in the profile. Feature points representing characteristics of a lip region may be extracted from lip boundaries 544 and 545 of the user in the profile. The regions and positions of the feature points in the regions mentioned above are provided for illustrative purposes only, and feature points may be extracted from other regions and different points 546 and 547.

Figure 6:
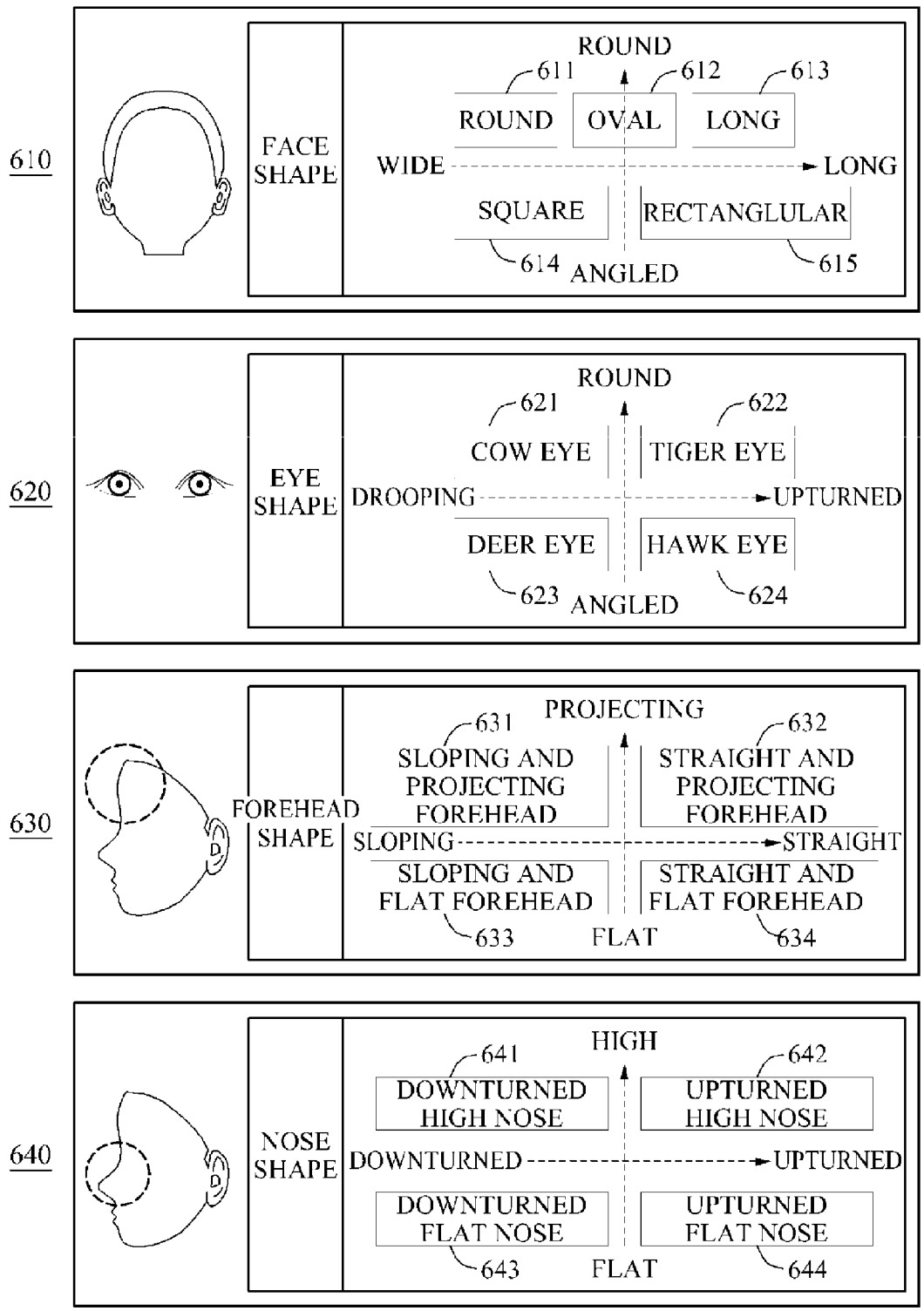
FIG. 6 illustrates concrete examples of facial expression types according to an embodiment.

FIG. 6 illustrates concrete examples of facial expression types according to an embodiment.

According to the embodiment, the facial expression type determination apparatus may determine a facial expression type of a user using a facial expression type function. The facial expression type may be represented by region of a face. For example, the region may include a face region, an eye region, a forehead region and a nose region. The extraction unit of the facial expression type determination apparatus may extract feature points representing facial characteristics. The extracted feature points may be grouped into a plurality of regions. The facial expression type determination unit may determine a facial expression type for each of a plurality of groups using feature points and a facial expression type function corresponding to each group.

According to one embodiment, diagram 610 divides a face shape according to a first predetermined criterion. The first criterion may be based on a degree of longness or roundness of a face shape. In diagram 610, an x-axis represents a degree of longness, and a y-axis represents a degree of roundness. Information on face shapes of a plurality of users is represented in a normal distribution, and the face shapes may be classified according to the first criterion. For example, the face shapes may be classified into round 611, oval 612, long 6142 square 614, rectangular 615, trapezoid (not shown) and inverted triangular (not shown).

According to another embodiment, diagram 620 divides an eye shape according to a second predetermined criterion. The second criterion may be based on a degree of an upturned eye at an outer corner and roundness of an eye. In diagram 620, an x-axis represents a degree of an upturned eye at an outer corner, and a y-axis represents a degree of roundness of an eye. Information on eye shapes of a plurality of users is represented in a normal distribution, and the eye shapes may be classified according to the second criterion. For example, the eye shapes may be classified into a cow eye 621, a tiger eye 622, a deer eye 623 and a hawk eye 624.

According to still another embodiment, diagram 630 divides a forehead shape according to a third predetermined criterion. The third criterion may be based on a slope of a forehead and a degree of a projecting forehead. In diagram 630, an x-axis represents a slope of a forehead, and a y-axis represents a degree of a projecting forehead. Information on forehead shapes of a plurality of users is represented in a normal distribution, and the forehead shapes may be classified according to the third criterion. For example, the forehead shapes may be classified into a sloping and projecting forehead 631, a straight and projecting forehead 632, a sloping and flat forehead 633, and a straight and flat forehead 634.

According to yet another embodiment, diagram 640 divides a nose shape according to a fourth predetermined criterion. The fourth criterion may be based on a shape of a nasal tip and nose height. In diagram 640, an x-axis represents a shape of a nasal tip, for example a degree of an upturned nose, and a y-axis represents a nose height. Information on nose shapes of a plurality of users is represented in a normal distribution, and the nose shapes may be classified according to the fourth criterion. For example, the nose shapes may be classified into a downturned high nose 641, an upturned high nose 642, a downturned flat nose 643, and an upturned flat nose 644.

Figure 7:
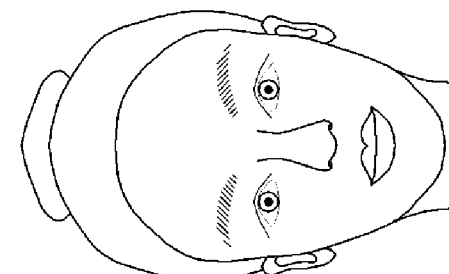
FIG. 7 illustrates results of facial expression types according to an embodiment.

FIG. 7 is a diagram illustrating results of facial expression types according to an embodiment.

According to the embodiment, the facial expression type determination apparatus may combine expression types of each of a plurality of groups and determine a facial expression type of a user based on a combination result.

Expression types of a face shape, an eye shape, a forehead shape and a nose shape may be determined based on a width and length. A width may be represented based on a degree of narrowness or wideness with, for example, A for narrow, B for slightly narrow, C for average, D for slightly wide, and E for wide. The degree of narrowness or wideness may be determined based on a normal distribution of data on a plurality of users. A length may be represented based on a degree of shortness or longness with, for example, A for short, B for slightly short, C for average, D for slightly long, and E for long. The degree of shortness or longness may be determined based on a normal distribution of data on a plurality of users.

FIG. 7 illustrates a facial expression type as a result of analyzing face, eye and nose regions of a user. The face, eye and nose regions are a narrow and short type.

Figure 8:
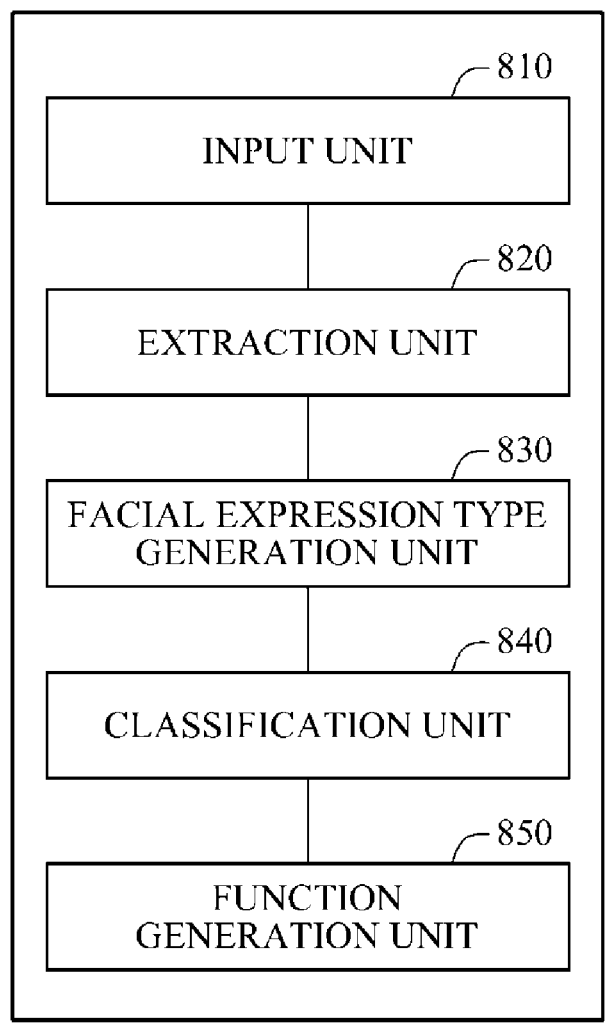
FIG. 8 is a block diagram illustrating a configuration of an apparatus for generating a facial expression type function according to an embodiment.

FIG. 8 is a block diagram illustrating a configuration of an apparatus of generating a facial expression type function according to an embodiment.

According to the embodiment, a facial expression type function generation apparatus 800 may include an input unit 810, an extraction unit 820, a facial expression type generation unit 830, a classification unit 840 and a function generation unit 850. A facial expression type function may be used to determine a facial expression type of a user.

The input unit 810 may receive facial images of a plurality of users. The facial images may be photographed by the facial expression type function generation apparatus 800 or images photographed externally may be input to the facial expression type function generation apparatus 800.

The extraction unit 820 may extract feature points corresponding to regions of the plurality of users from the facial images of the users. Here, the regions may include at least one of a face, an eye, a forehead and a nose, and a facial expression type may be represented using at least one of a face shape, an eye shape, a forehead shape and a nose shape.

The facial expression type generation unit 830 may generate a facial expression type using the feature points corresponding to regions of the users.

According to the embodiment, the facial expression type may be determined using a distribution of feature points in the plurality of regions. For instance, the face shape may be divided into round, oval, long, square, rectangular, trapezoid and inverted triangular shapes. Although the face shape may be divided into six categories, the facial expression type may be represented differently even in one category of the face shape. In a coordinate system defined by an x-axis representing a degree of longness and a y-axis representing a degree of roundness, a facial expression type of a user may be represented more accurately by putting dots. Even though the facial expression type is oval, coordinates may be represented at different positions depending on a width and length of a user face.

The classification unit 840 may represent generated facial expression types in a normal distribution and classify the facial expression types generated according to a preset criterion. According to one embodiment, the classification unit 840 may represent widths and lengths corresponding to the regions of the users in normal distributions and classify the normal distributions into predetermined sections.

Alternatively, the facial expression types may be represented based on widths and lengths of the plurality of regions.

In detail, the widths and lengths of the respective regions of the users may be represented in normal distributions, and the normal distributions may be classified into predetermined sections. For example, the normal distributions may be divided into five categories, such as 9%, 23%, 36%, 23% and 9% sections.

The facial expression type generation unit 830 may generate a facial expression type using the feature points corresponding to the regions of the users. The facial expression type generation unit 830 may acquire facial information using the extracted feature points. The facial information may include a width of a region, a length of the region, a ratio of the length to the width, an area of the region and a ratio of the region to an entire face region.

The classification unit 840 may represent a normal distribution using the acquired facial information and classify the facial expression types based on the distribution. The facial expression types may be determined based on at least one of the face shape, the eye shape, the forehead shape and the nose shape.

According to one embodiment, the face shape may be divided according to a first predetermined criterion into round, oval, long, square, rectangular, trapezoid and inverted triangular shapes. Here, the first criterion may be based on a degree of longness or roundness of a face shape.

According to another embodiment, the eye shape may be divided according to a second predetermined criterion into a cow eye, a tiger eye, a deer eye and a hawk eye. Here, the second criterion may be based on a degree of longness of tips of a user's eyes and roundness of an overall eye shape.

According to still another embodiment, the forehead shape may be divided according to a third predetermined criterion into a sloping and projecting forehead, a straight and projecting forehead, a sloping and flat forehead, and a straight and flat forehead. Here, the third criterion may be based on a slope of a user's forehead and a degree of a projecting forehead.

According to yet another embodiment, the nose shape may be divided according to a fourth predetermined criterion into a downturned high nose, an upturned high nose, a downturned flat nose, and an upturned flat nose. The fourth criterion may be based on a shape of a nasal tip and nose height.

The function generation unit 850 may generate a facial expression type function using a determined facial expression type. The facial expression type function may be generated by a plurality of regions.

Hereinafter, various operations and applications implemented by the facial expression type function generation apparatus will be illustrated, in which matters to be clearly understood and conceived by a person having ordinary skill in the art may be realized by general implementation without specifying any of the input unit, the extraction unit, the facial expression type generation unit, the classification unit and the function generation unit and the scope of claims of the present invention is not limited by titles or physical/logical structures of particular components.

FIG. 9 is a flowchart illustrating a method of generating a facial expression type function according to an embodiment.

According to the embodiment, the facial expression type function generation apparatus may receive facial images of a plurality of users in operation 910.

The facial expression type function generation apparatus may extract feature points corresponding to regions of the users from the facial images of the users in operation 920. The feature points are points for representing facial characteristics.

The facial expression type function generation apparatus may generate facial expression types using the feature points corresponding to the regions of the users in operation 930.

The facial expression type function generation apparatus may represent the facial expression types in a normal distribution and classify the facial expression types using the normal distribution in operation 940.

The facial expression type function generation apparatus may generate a facial expression type function using the classified facial expression types in operation 950.

The apparatuses described herein may be implemented using hardware components, software components, and/or combinations of hardware components and software components. For instance, the units and components illustrated in the embodiments may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor or any other device capable of responding to and executing instructions.

A processing device may run an operating system (OS) and one or more software applications that run on the OS. The processing device also may access, store, manipulate, process, and create data in response to execution of the software.

For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or one or more combinations thereof, to independently or collectively instruct or configure the processing device to operate as desired.

Software and/or data may be embodied permanently or temporarily in any type of machine, component, physical or virtual equipment, computer storage medium or device, or in a propagated signal wave in order to provide instructions or data to the processing device or to be interpreted by the processing device. The software may also be distributed over network coupled computer systems so that the software is stored and executed in a distributed fashion. The software and data may be stored by one or more non-transitory computer readable recording mediums.

The methods according to the embodiments may be realized as program instructions implemented by various computers and be recorded in non-transitory computer-readable media. The media may also include, alone or in combination with the program instructions, data files, data structures, and the like. The program instructions recorded in the media may be designed and configured specially for the embodiments or be known and available to those skilled in computer software.

Examples of the non-transitory computer readable recording medium may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like.

Examples of program instructions include both machine codes, such as produced by a compiler, and higher level language codes that may be executed by the computer using an interpreter.

The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, it should be noted that the scope of the present invention is not limited by the illustrated embodiments but defined by the appended claims and their equivalents.

What is claimed is:

1. A computer-implemented method of determining a facial expression type, the method comprising:
    extracting feature points representing facial characteristics from a facial image of a user;
    grouping the extracted feature points into a plurality of groups based at least in part on a plurality of regions; and
    determining, by at least one processor, a facial expression type for each of the plurality of groups of the extracted feature points by applying the extracted feature points to a facial expression type function corresponding to each of the plurality of groups of the extracted feature points,
    wherein the determining of the facial expression type for each of the plurality of groups comprises: receiving an input of age information on the user; calibrating the facial expression type function on a basis of the age information; and determining the facial expression type for each of the plurality of groups using the calibrated facial expression type function, and
    wherein the calibrating of the facial expression type function comprises: dividing the age information into predetermined age groups; calculating widths and lengths of the respective regions using the feature points; calculating averages and standard deviations of the widths and lengths of the respective regions in the divided age groups; and calibrating the facial expression type function using the averages and standard deviations.

2. The method of claim 1, further comprising displaying the determined facial expression type of the user.

3. The method of claim 1, further comprising generating the facial expression type function, wherein the generating of the facial expression type function comprises receiving facial images of a plurality of users; extracting feature points corresponding to regions of the users from the facial images of the users; generating facial expression types using the feature points corresponding to the regions of the users; representing the generated facial expression types in a normal distribution and classifying the facial expression types according to a preset criterion; and generating the facial expression type function using the classified facial expression types.

4. The method of claim 1, wherein the plurality of regions comprises at least one of a face, an eye, a forehead and a nose, and the facial expression type for each of the plurality of groups is represented using at least one of a face shape, an eye shape, a forehead shape and a nose shape.

5. The method of claim 1, wherein the plurality of regions comprises at least one of a face, an eye, a forehead and a nose, and the facial expression type is represented based on widths and lengths of regions of a face shape, an eye shape, a forehead shape and a nose shape.

6. The method of claim 4, wherein the face shape is divided according to a first predetermined criterion into round, oval, long, square, rectangular, trapezoid and inverted triangular shapes, the eye shape is divided according to a second predetermined criterion into a cow eye, a tiger eye, a deer eye and a hawk eye, the forehead shape is divided according to a third predetermined criterion into a sloping and projecting forehead, a straight and projecting forehead, a sloping and flat forehead and a straight and flat forehead, and the nose shape is divided according to a fourth predetermined criterion into a downturned high nose, an upturned high nose, a downturned flat nose and an upturned flat nose.

7. The method of claim 1, further comprising combining facial expression types of the respective groups.

8. A computer-implemented method of generating a facial expression type function which generates a facial expression type function, the method comprising:
    receiving facial images of a plurality of users;
    extracting feature points corresponding to regions of the users from the facial images of the users;
    generating facial expression types using the feature points corresponding to the regions of the users;
    determining at least one criterion for which the generated facial expression types can be represented in a normal distribution;
    classifying the facial expression types based at least on the at least one criterion; and
    generating, by at least one processor, a facial expression type function using the classified facial expression types,
    wherein the regions comprise at least one of a face, an eye, a forehead and a nose, and the facial expression types are represented using at least one of a face shape, an eye shape, a forehead shape and a nose shape, and
    wherein the face shape is divided according to a first predetermined criterion into round, oval, long, square, rectangular, trapezoid and inverted triangular shapes, the eye shape is divided according to a second predetermined criterion into a cow eye, a tiger eye, a deer eye and a hawk eye, the forehead shape is divided according to a third predetermined criterion into a sloping and projecting forehead, a straight and projecting forehead, a sloping and flat forehead and a straight and flat forehead, and the nose shape is divided according to a fourth predetermined criterion into a downturned high nose, an upturned high nose, a downturned flat nose and an upturned flat nose.

9. The method of claim 8, wherein the facial expression types are determined using a distribution of the feature points for the respective regions.

10. The method of claim 8, wherein the regions comprise at least one of a face, an eye, a forehead and a nose, and the facial expression types are represented based on widths and lengths of the regions.

11. The method of claim 10, wherein the at least one criterion comprises the widths and lengths of the regions of the users, and the method further comprises:
    segmenting the normal distribution into predetermined sections.

12. A non-transitory computer-readable recording medium recording a program to implement a method of generating a facial expression type function, the method comprising:

receiving facial images of a plurality of users;

extracting feature points corresponding to regions of the users from the facial images of the users;

generating facial expression types using the feature points corresponding to the regions of the users;

determining at least one criterion for which the generated facial expression types can be represented in a normal distribution;

classifying the facial expression types based at least in part on the at least one criterion; and generating a facial expression type function using the classified facial expression types, wherein the regions comprise at least one of a face, an eye, a forehead and a nose, and the facial expression types are represented using at least one of a face shape, an eye shape, a forehead shape and a nose shape, and wherein the face shape is divided according to a first predetermined criterion into round, oval, long, square, rectangular, trapezoid and inverted triangular shapes, the eye shape is divided according to a second predetermined criterion into a cow eye, a tiger eye, a deer eye and a hawk eye, the forehead shape is divided according to a third predetermined criterion into a sloping and projecting forehead, a straight and projecting forehead, a sloping and flat forehead and a straight and flat forehead, and the nose shape is divided according to a fourth predetermined criterion into a downturned high nose, an upturned high nose, a downturned flat nose and an upturned flat nose.

13. An apparatus for determining a facial expression type, the apparatus comprising:

an extraction circuit to extract feature points representing facial characteristics from a facial image of a user;

a grouping circuit to group the extracted feature points into a plurality of groups based at least in part on a plurality of regions; and a facial expression type determination circuit to determine a facial expression type for each of the plurality of groups by inputting the extracted feature points to a facial expression type function corresponding to each of the plurality of groups, wherein the facial expression type determination circuit is configured to determine the facial expression type for each of the plurality of groups by: receiving an input of age information on the user; calibrating the facial expression type function on a basis of the age information; and determining the facial expression type for each of the plurality of groups using the calibrated facial expression type function, and wherein the facial expression type determination circuit is configured to calibrate the facial expression type function by: dividing the age information into predetermined age groups; calculating widths and lengths of the respective regions using the feature points; calculating averages and standard deviations of the widths and lengths of the respective regions in the divided age groups; and calibrating the facial expression type function using the averages and standard deviations.

14. The apparatus of claim 13, further comprising an input circuit to receive an input of age information on the user, wherein the facial expression type determination circuit calibrates the facial expression type function on a basis of the age information and determines the facial expression type for each of the plurality of groups using the calibrated facial expression type function.

15. An apparatus for generating a facial expression type function, the apparatus comprising:

at least one processor circuit configured to:

receive facial images of a plurality of users;

extract feature points corresponding to regions of the users from the facial images of the users;

generate facial expression types using the feature points corresponding to the regions of the users;

determine at least one criterion for which the generated facial expression types can be represented in a normal distribution;

classify the facial expression types based at least in part on the at least one criterion; and generate a facial expression type function using the classified facial expression types, wherein the regions comprise at least one of a face, an eye, a forehead and a nose, and the facial expression types are represented using at least one of a face shape, an eye shape, a forehead shape and a nose shape, and wherein the face shape is divided according to a first predetermined criterion into round, oval, long, square, rectangular, trapezoid and inverted triangular shapes, the eye shape is divided according to a second predetermined criterion into a cow eye, a tiger eye, a deer eye and a hawk eye, the forehead shape is divided according to a third predetermined criterion into a sloping and projecting forehead, a straight and projecting forehead, a sloping and flat forehead and a straight and flat forehead, and the nose shape is divided according to a fourth predetermined criterion into a downturned high nose, an upturned high nose, a downturned flat nose and an upturned flat nose.

\* \* \* \* \*